United States Patent [19]

Anderson, Jr. et al.

[11] Patent Number: 4,522,869
[45] Date of Patent: * Jun. 11, 1985

[54] POLYMERIC-COATED FABRIC LAYER, PRODUCT UTILIZING THE LAYER AND METHOD OF MAKING THE SAME

[75] Inventors: John F. Anderson, Jr., Springfield, Mo.; Delmar D. Long, Rock Hill, S.C.

[73] Assignee: Dayco Corporation, Dayton, Ohio

[*] Notice: The portion of the term of this patent subsequent to May 28, 2002 has been disclaimed.

[21] Appl. No.: 482,363

[22] Filed: Apr. 5, 1983

[51] Int. Cl.³ .............................................. B32B 7/00
[52] U.S. Cl. .................................... 428/245; 156/137; 156/139; 198/847; 428/246; 428/257; 428/260; 428/296; 428/304.4; 474/260
[58] Field of Search ............... 428/245, 246, 250, 260, 428/262, 304.4, 319.7, 319.9, 296; 198/847; 474/260; 156/137, 139

[56] References Cited

U.S. PATENT DOCUMENTS

| | | | |
|---|---|---|---|
| 3,527,654 | 9/1970 | Jones et al. | 428/319.7 |
| 3,620,890 | 11/1971 | Kemmler | 428/304.4 |
| 3,862,291 | 1/1975 | Brandon et al. | 264/49 |
| 4,062,989 | 12/1977 | Long | 427/176 |
| 4,098,944 | 7/1978 | Pollock | 428/262 |
| 4,205,559 | 6/1980 | Long et al. | 74/233 |

Primary Examiner—James J. Bell
Attorney, Agent, or Firm—Joseph V. Tassone

[57] ABSTRACT

A polymeric belt construction and method of making the same are provided, the belt construction comprising a polymeric belt body and a polymeric-coated fabric layer secured to a surface of the polymeric belt body, the fabric layer comprising a fabric layer having opposed sides and a layer of polymeric material secured to one of those sides and having an outer surface facing away from the fabric layer and being secured to the surface of the polymeric belt body by a heat curing operation on the belt body and the layer in the assembled relation thereof, the polymeric layer comprising a foamed polymeric layer whereby the outer surface thereof readily conforms to the surface of the belt body to improve the bond therebetween during the heat curing operation thereof.

20 Claims, 4 Drawing Figures

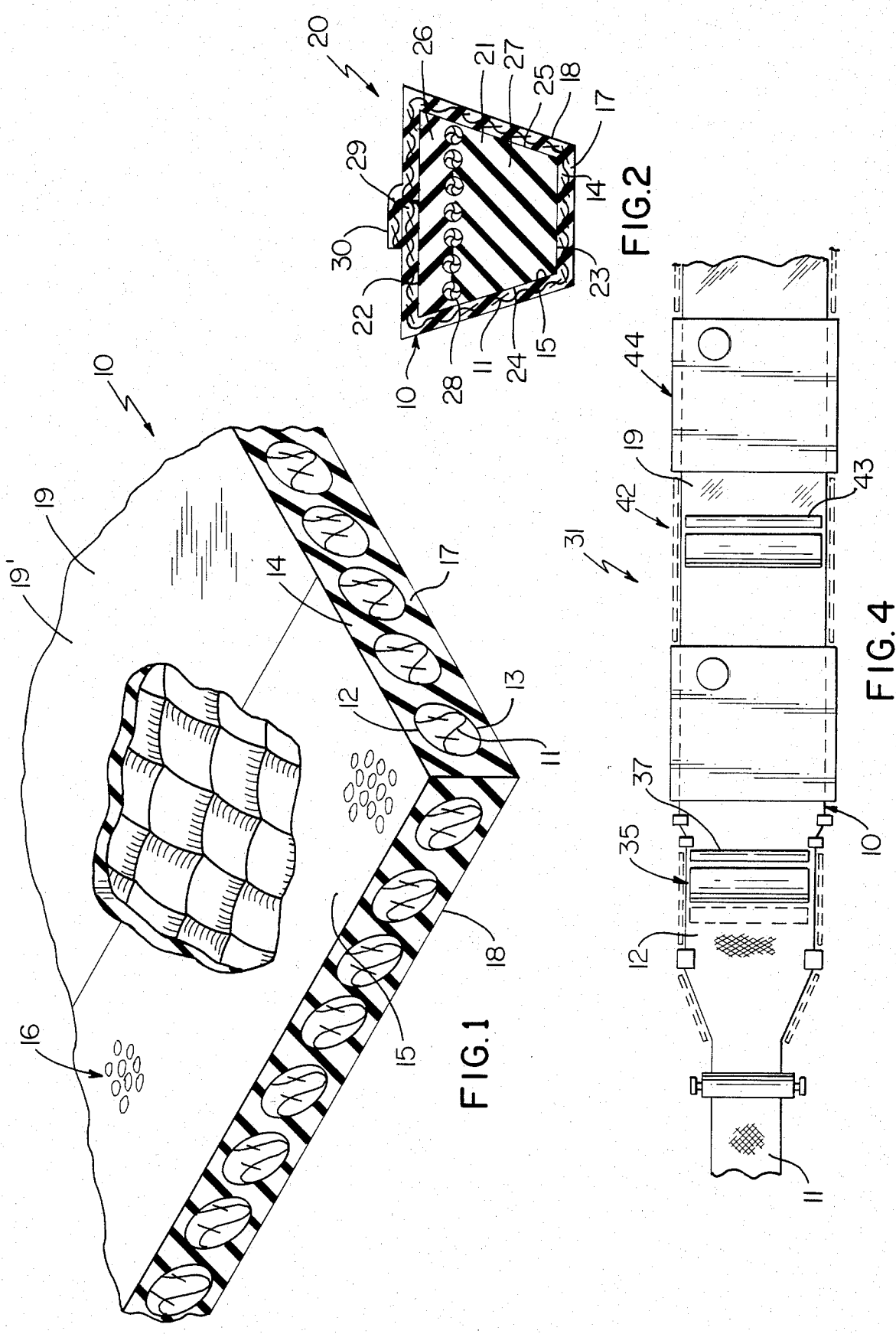

POLYMERIC-COATED FABRIC LAYER, PRODUCT UTILIZING THE LAYER AND METHOD OF MAKING THE SAME

BACKGROUND OF THE INVENTION

1. Field of the Invention

This invention relates to an improved polymeric-coated fabric layer means and a polymeric product utilizing such fabric layer means as well as to a method for making such a fabric layer means.

2. Prior Art Statement

It is known in the art to provide a polymeric-coated fabric layer means for being secured to a surface of a polymeric product, the fabric layer means comprising a fabric layer having opposed sides and a layer of polymeric material secured to one of the sides of the fabric layer and having an outer surface facing away from the fabric layer for being secured to the surface of the product. For example, see the patent to Long, U.S. Pat. No. 4,062,989 and the U.S. patent to Long et al., U.S. Pat. No. 4,205,559.

It is also known to secure a foamed or foamable polymeric layer to one side of a fabric layer, and to overcoat the outer surface of the foamed layer with a polymeric layer. For example, see the U.S. patent to Jones et al., U.S. Pat. No. 3,527,654; the U.S. patent to Brandon et al., U.S. Pat. No. 3,862,291; and the U.S. patent to Pollock, U.S. Pat. No. 4,098,944.

SUMMARY OF THE INVENTION

It is one feature of this invention to provide an improved polymeric-coated fabric layer means for being secured to a surface of a polymeric product, such as an endless transmission belt construction and the like.

In particular, one of the major problems in the making of a polymeric-coated fabric layer means for use in V-belt constructions has been to provide sufficient building tack and currently such systems employ various resins, rosins or oils to impart the necessary tack.

However, it is believed according to the teachings of this invention that the tack of a polymeric-coated fabric layer means may be greatly improved without the use of tackifying additives by the placing of the polymeric material on the fabric layer for better conformability of the surface of the resulting fabric layer means to the surface of the polymeric product when the two surfaces are brought into contact with each other for securement therebetween.

It is believed that such positioning of the polymeric material on the surface of the fabric layer can be accomplished by the applying of a foamed polymeric layer on the surface of the fabric layer which layer through its cellular structure allows for excellent surface conformability of its surface with a surface of the polymeric product, such foamed polymeric layer being utilized by itself or being filled with an overcoating of polymeric material which provides a uniform surface that tends to smooth out surface irregularities in the fabric layer and thus allows for better polymeric contact when its surface is brought against the surface of the polymeric product.

For example, one embodiment of this invention provides a polymeric belt construction comprising a polymeric belt body and a polymeric-coated fabric layer means secured to a surface of the polymeric belt body, the fabric layer means comprising a fabric layer having opposed sides and a layer of polymeric material secured to one of those sides of the fabric layer and having an outer surface facing away from the fabric layer and being secured to the surface of the polymeric belt body by a heat curing operation on the belt body and the layer in the assembled relation thereof. The polymeric layer comprises a foamed polymeric layer whereby the outer surface thereof readily conforms to the surface of the belt body to improve the bond therebetween during the heat curing operation thereof.

Accordingly, it is an object of this invention to provide an improved polymeric belt construction having one or more of the novel features of this invention as set forth above or hereinafter shown or described.

Another object of this invention is to provide a method of making such a polymeric belt construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a broken away cross-sectional perspective view of the polymeric-coated fabric layer means of this invention.

FIG. 2 is a cross-sectional view of an endless power transmission belt construction or the like utilizing the layer means of this invention that is illustrated in FIG. 1.

FIG. 4 is a schematic, fragmentary, reduced top view of the apparatus of FIG. 3.

DESCRIPTION OF THE PREFERRED EMBODIMENT

Figure 3:
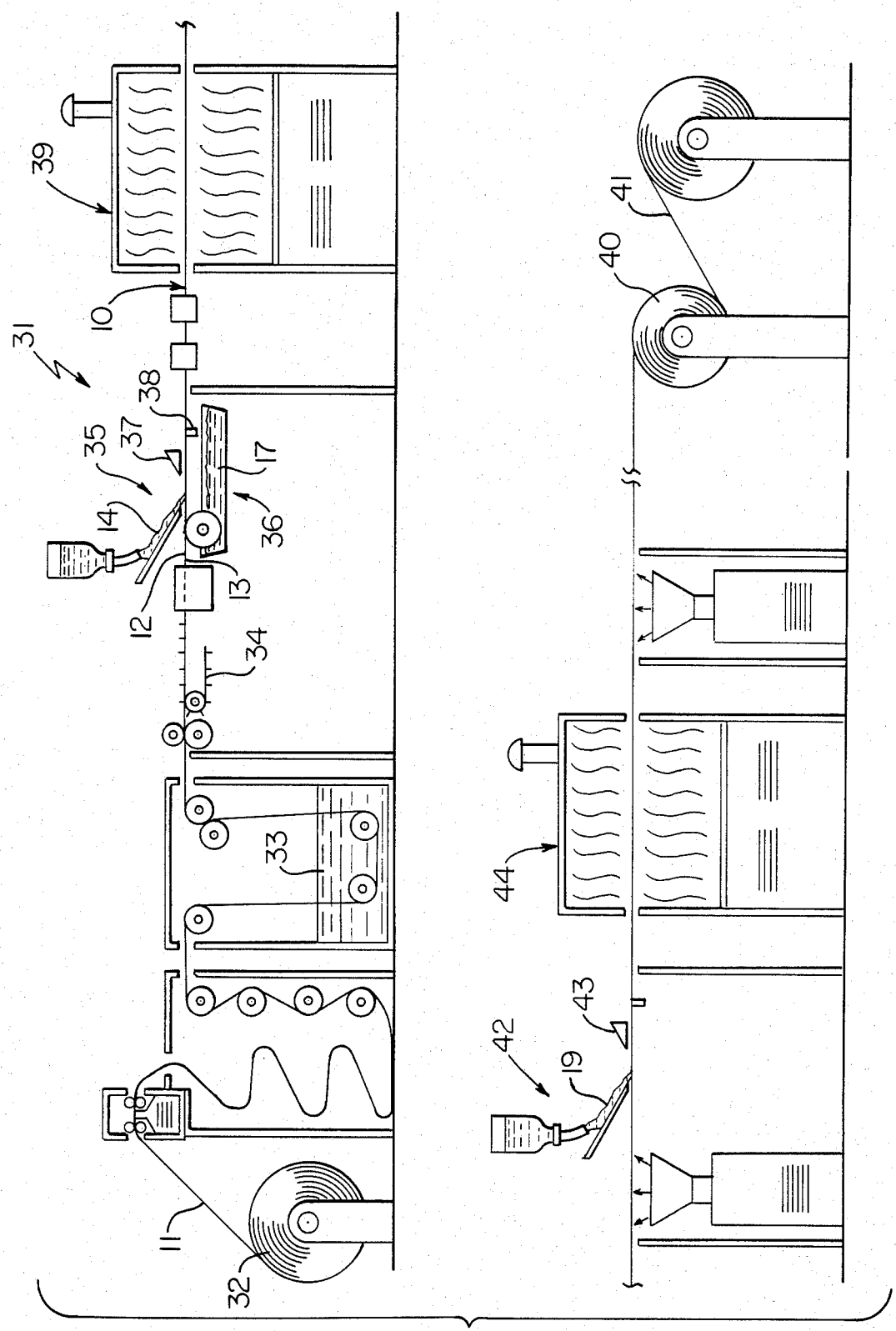
FIG. 3 is a schematic view illustrating the method and apparatus of this invention for making the polymeric-coated fabric layer means of FIG. 1.

While the various features of this invention are hereinafter illustrated and described as being particularly adapted to provide a polymeric-coated fabric layer means for making particular products, it is to be understood that the various features of this invention can be utilized singly or in various combinations thereof to provide a polymeric-coated fabric layer means for other uses and/or other products as desired.

Therefore, this invention is not to be limited to only the embodiment illustrated in the drawings, because the drawings are merely utilized to illustrate one of the wide variety of uses of this invention.

Referring now to FIG. 1, the improved polymeric-coated fabric layer means of this invention is generally indicated by the reference numeral 10 and comprises a suitable fabric layer 11 of a type well known in the art, such as a bias fabric layer, having opposed sides 12 and 13 and a layer 14 of polymeric material secured to the side 12 of the fabric layer 11 in a manner hereinafter set forth to define an outer substantially flat surface 15 for being secured to a surface of a polymeric product as will be hereinafter described, the polymeric layer 14 of this invention comprising a foamed polymeric layer, such as a foamed latex layer, which has an open cellular structure throughout the same as represented generally by the reference numeral 16 in FIG. 1. It is believed that such cellular structure 16 of the foamed polymeric layer 14 permits the surface 15 thereof to readily conform to the surface of the polymeric product to which the layer means 10 is to be secured when the surface 15 thereof is brought into contact with the surface of the polymeric product for securement therebetween whereby it is believed that the layer 14 need not have a tactifying additive provided therein for this securement purpose as in some prior known polymeric-coated fabric layer means.

For example, see the copending patent application of Delmar D. Long, one of the co-inventors of this invention, Ser. No. 350,969, filed Feb. 22, 1982, whereby a tacky layer is provided for such securement purposes. Since this copending patent application describes the various uses of polymeric-coated fabric layer means and a method and apparatus for making the same which is similar to this invention as will be apparent hereinafter, this copending patent application is being incorporated into this disclosure by this reference thereto.

In addition, the aforementioned U.S. Pat. Nos. 4,062,989 to Long and 4,205,559 to Long et al. are also being incorporated into this disclosure by this reference thereto as such U.S. patents disclose other types of polymeric-coated fabric layer means for uses similar to the uses of the polymeric-coated fabric layer means 10 of this invention.

If desired, another layer 17 of polymeric material, such as a latex, can be secured to the other side 13 of the fabric layer 11 so as to define an outside surface 18 thereof which will subsequently provide an outside surface of the product utilizing such layer means 10.

Also, it is believed according to the teachings of this invention that the foamed layer 14 can have its outside surface 15 overcoated with polymeric material 19, such as a suitable latex, that substantially fills the open cells or openings 16 in the surface 15 as illustrated in FIG. 1. Such overcoating 19 can even extend outwardly beyond the surface 15 to completely coat the same in addition to filling the openings 16 thereof, if desired, such overcoating 19 defining the outer surface 19' as illustrated in FIG. 1.

However, it is to be understood that the overcoating 19 need not be applied to the surface 15 of the layer means 14 as it is believed that the surface 15 of the layer 14 with or without the overcoating 19 allows for better conformability of the contacting surface of the fabric layer means 10 to a surface of a polymeric product utilizing such layer means 10 without the use of a tactifying additive in the fabric layer means 10 of this invention.

For example, reference is now made to FIG. 2 wherein a product of this invention is generally indicated by the reference numeral 20 and comprises endless power transmission belt of a typical "V" type wherein the polymeric body 21 thereof has a substantially trapezoidal cross-sectional configuration defined by a pair of opposed flat parallel top and bottom surfaces 22 and 23 with a pair of angled side surfaces 24 and 25 disposed therebetween, the belt construction 20 having the conventional tension section 26, compression section 27 and load-carrying section 28 disposed intermediate the tension section 26 and compression section 27 in a manner well known in the art.

As is conventional in the art, the opposed angular surfaces 24 and 25 of the belt construction 20 are each adapted to have a friction layer, that comprises a fabric impregnated with a polymeric composition, secured thereon by such friction layer either being disposed only on the surfaces 24 and 25 thereof or by having the entire outside surface of the belt body 21 wrapped with the friction layer.

In any event, it can be seen that the belt construction 20 illustrated in FIG. 2 is completely wrapped by a strip of the polymeric-coated fabric layer means 10 of this invention so that the opposed ends 29 and 30 of the layer means 10 are disposed and secured in overlapping relation, such as on the top surface 22 of the belt construction 20 as illustrated in FIG. 2 and is conventional in the belt making art.

When utilizing the layer means 10 of this invention for forming the belt construction 20 of FIG. 2, it can be seen that the side or surface 15 or 19' of the layer means 10 is disposed in contact with the outer surfaces 22, 23, 24 and 25 of the polymeric body 21 of the belt construction 20 so as to readily conform to such surfaces 22, 23, 24 and 25 during a subsequent heat curing or vulcanizing of the belt construction 20 after the layer means 10 has been wrapped on the belt body 21 in a manner well known in the art of making belt constructions.

It is believed that by utilizing the foamed layer 14 of this invention, whether the same has the overcoating 19 or not, excellent adhesion will be provided between the layer 14 and the belt body 21 during the subsequent vulcanizing or curing operation of the belt construction 20 since the cellular construction 16 of the foamed layer 14 readily permits the layer 14 to conform to the surfaces 22, 23, 24 and 25 of the belt body 21 not only during the wrapping of the layer means 10 against the belt body 21, but also during the subsequent heat curing and vulcanizing operation.

As illustrated in FIG. 2, the outer surface 18 of the layer 17 provides the contact facing of the belt construction 20 at the driving or driven sides 24 and 25 thereof as is conventional in the art.

While the layer means 10 of this invention has been previously described as forming an outside surface of a belt product, it is to be understood that the layer means 10 of this invention can provide not only an outside surface thereof but also in addition thereto or in lieu thereof could form part of an inner layer of the belt product if desired. In fact, the layer 17 could also be a foamed polymeric layer in a manner similar to the layer 14 so as to provide good conformability on both sides of the fabric layer 11 of the layer means 10 if desired.

Also, while the layer means 10 of this invention has been previously described as forming a part or parts of a belt construction or the like, it is to be understood that there are other products that can utilize the layer means 10 of this invention. For example, the layer means 10 can provide part of a printing blanket, part of a hose construction as well as be utilized for making the entire hose construction, gasket means, etc., whereby it can be seen that the layer means 10 of this invention can be utilized as a product itself or with other products not disclosed in this application because it is believed that the same is readily adapted to be utilized where any such polymeric-coated fabric layer means is presently being used or where such polymeric-coated fabric layer means could possibly be used.

While the layer means 10 of this invention is hereinafter illustrated and described as being formed by a particular method and apparatus as illustrated in FIGS. 3 and 4, it is to be understood that this invention is not to be limited to the specific method and apparatus illustrated in FIGS. 3 and 4 as the same is merely being disclosed as a believed to be possible method and apparatus for making the layer means 10 of this invention.

Therefore, reference is now made to FIGS. 3 and 4 wherein a method and apparatus of this invention for forming the layer means 10 of FIG. 1 is generally indicated by the reference numeral 31 and will now be described.

As illustrated in FIG. 3, the fabric layer 11 is fed from a supply roll 32 thereof through a liquid 33 that impregnates and lubricates the threads thereof so that the same can be readily stretched on a tenter frame 34 in a direction transverse to the longitudinal direction of the fabric sheet 11. Thereafter, the foamed polymeric material 14 in liquid form is applied to the top surface 12 of the fabric sheet while simultaneously the polymeric material 17 in liquid form is being applied to the bottom surface 13 of the fabric sheet 11 by respective coating means that are generally indicated by the reference numerals 35 and 36 in FIG. 3, such liquid materials 14 and 17 being respectively doctored by suitable doctor means 37 and 38 disposed on opposite sides of the now coated fabric sheet 11 to produce the coated fabric layer means of this invention that is generally indicated by the reference numeral 10 in FIG. 3. The coatings 14 and 17 are sufficiently liquid to impregnate the fiber bundles of the fabric layer 11 so as to provide good adhesion of the layers 14 and 17 to the fabric layer 11.

The coated sheet 11 is now passed through a heating means that is generally indicated by the reference numeral 39 for substantially drying the coatings 14 and 17 without curing the same so that the polymeric-coated fabric layer means 10 can be wound into a supply roll 40 thereof with a sheet 41 wound therewith to prevent the wound polymeric-coated fabric layer means 10 of this invention from securing to itself in the roll 40 as is well known in the art.

The method and apparatus 31 of this invention is also adapted to provide the overcoat 19 on the layer means 14 of the polymeric-coated fabric layer means 10 if desired. For example, such overcoating 19 can be applied in liquid form by a suitable applicator means that is generally indicated by the reference numeral 42 in FIG. 3 and can be doctored by suitable doctor means 43 which either provides a thickness to the overcoating 19 above the entire surface 15 of the foamed layer or merely causes the coating 19 to just fill the openings 16 in the side 15 of the foamed layer 14 as desired.

In any event, after the overcoating 19 is applied to the side 15 of the foamed layer 14, the polymeric-coated fabric layer means 10 is passed through a heating means 44 which substantially dries the overcoating 19 without curing the coatings 14, 17 and 19 before the polymeric-coated fabric layer means 10 of this invention is wound into the supply roll 40 thereof.

Therefore, it can be seen that when it is desired to utilize the layer means 10 of this invention, a sufficient quantity thereof can be dispensed from the supply roll 40 thereof to be utilized either by itself after subsequent curing thereof or remaining uncured or in combination with a polymeric product, such as by forming the belt construction 20 in the manner previously described, whereby it can be seen that this invention provides an improved polymeric-coated fabric layer means 10 for being secured to a surface of a polymeric product, the fabric layer means 10 comprising a fabric layer 11 having opposed sides 12 and 13 and a layer of polymeric material 14 secured to the side 12 of fabric layer 11 and having an outer surface 15 facing away from the fabric layer 11 for being secured to the surface of the product, the polymeric layer 14 comprising a foamed polymeric layer whereby the outer surface 15 thereof is adapted to readily conform to the surface of the product when the surfaces are brought into contact with each other for securement therebetween.

While the layer means 10 of this invention has been previously described as having open cells or openings 16 in the surface 15 of the foamed layer 14, it is to be understood that other types of suitable foamed polymeric materials can be utilized for making the layer means 10 of this invention. For example, a foamed polymeric material, such as a foamed latex, can be provided for the layer 14 wherein the outer surface 15 thereof is substantially free of openings 16 so as to be substantially impervious as is illustrated in FIG. 1 between the areas of the openings 16. Such layer means 10 can have the substantially impervious outer surface 15 of the foamed layer 14 disposed in contact with the desired surface of a polymeric product or such impervious surface 15 can be first overcoated with the polymeric layer 19 as previously described. In any event, it is believed that such layer means 10 with the substantially impervious outer surface 15 of the foamed layer 14 will be adapted to readily conform to the surface of a polymeric product when the surface 15 of 19' of the layer means 10 is brought into contact therewith because of the cellular structure, whether open, closed or in various combinations thereof, of the foamed layer 14 as previously described and for the same purposes.

Accordingly, it can be seen that this invention not only provides an improved polymeric-coated fabric layer means and method of making the same, but also this invention provides an improved product utilizing such a layer means.

While the forms and methods of this invention now preferred have been illustrated and described as required by the Patent Statute, it is to be understood that other forms and method steps can be utilized and still fall within the scope of the appended claims.

What is claimed is:

1. In a polymeric belt construction comprising a polymeric belt body and a polymeric-coated fabric layer means secured to a surface of said polymeric belt body, said fabric layer means comprising a fabric layer having opposed sides, and a layer of polymeric material secured to one of said sides of said fabric layer and having an outer surface facing away from said fabric layer and being secured to said surface of said polymeric part of belt body by a heat curing operation on said belt body and said layer in the assembled relation thereof, the improvement wherein said polymeric layer comprises a foamed polymeric layer whereby said outer surface thereof readily conforms to said surface of said belt body to improve the bond therebetween during said heat curing operation thereof.

2. A belt construction as set forth in claim 1 wherein said foamed polymeric layer comprises a foamed latex layer.

3. A belt construction as set forth in claim 1 wherein said foamed layer has a plurality of openings in said outer surface thereof.

4. A belt construction as set forth in claim 3 and including an overcoating of polymeric material on said outer surface that fills said openings thereof.

5. A belt construction as set forth in claim 1 and including another layer of polymeric material secured to the other of said sides of said fabric layer, said other layer defining an outside surface of said belt construction.

6. A belt construction as set forth in claim 1 wherein said fabric layer comprises a bias fabric layer.

7. A belt construction as set forth in claim 1 wherein said foamed layer has a substantially impervious outer surface thereof.

8. A belt construction as set forth in claim 1 and including an overcoating of polymeric material on said outer surface of said foamed layer.

9. A belt construction as set forth in claim 1 wherein said belt construction comprises an endless power transmission belt construction.

10. A belt construction as set forth in claim 9 wherein said fabric layer means defines at least part of the outside surface of said belt construction.

11. In a method of making a polymeric belt construction comprising a polymeric belt body and a polymeric-coated fabric layer means secured to a surface of said polymeric belt body, said fabric layer means comprising a fabric layer having opposed sides, and a layer of polymeric material secured to one of said sides of said fabric layer and having an outer surface facing away from said fabric layer and being secured to said surface of said polymeric belt body by a heat curing operation on said belt body and said layer in the assembled relation thereof, the improvement comprising the step of forming said polymeric layer to comprise a foamed polymeric layer whereby said outer surface thereof readily conforms to said surface of said belt body to improve the bond therebetween during said heat curing operation thereof.

12. A method as set forth in claim 11 and including the step of forming said foamed polymeric layer to comprise a foamed latex layer.

13. A method as set forth in claim 11 and including the step of forming said foamed layer to have a plurality of openings in said outer surface thereof.

14. A method as set forth in claim 13 and including the step of applying an overcoating of polymeric material on said outer surface that fills said openings thereof.

15. A method as set forth in claim 11 and including the step of securing another layer of polymeric material to the other of said sides of said fabric layer whereby said other layer defines an outside surface of said belt construction.

16. A method as set forth in claim 11 and including the step of forming said fabric layer to comprise a bias fabric layer.

17. A method as set forth in claim 11 and including the step of forming said foamed layer to have a substantially impervious outer surface thereof.

18. A method as set forth in claim 11 and including the step of applying an overcoating of polymeric material on said outer surface of said foamed layer.

19. A method as set forth in claim 11 wherein said belt construction comprises an endless power transmission belt construction.

20. A method as set forth in claim 19 wherein said fabric layer means defines at least part of the outside surface of said belt construction.

* * * * *